United States Patent
Li et al.

(10) Patent No.: US 12,425,133 B2
(45) Date of Patent: Sep. 23, 2025

(54) PHYSICAL UPLINK CONTROL CHANNEL TRANSMISSION METHOD AND APPARATUS, DEVICE AND MEDIUM

(71) Applicant: VIVO MOBILE COMMUNICATION CO., LTD., Dongguan (CN)

(72) Inventors: Na Li, Dongguan (CN); Xueming Pan, Dongguan (CN); Peng Sun, Dongguan (CN)

(73) Assignee: VIVO MOBILE COMMUNICATION CO., LTD., Dongguan (CN)

(*) Notice: Subject to any disclaimer, the term of this patent is extended or adjusted under 35 U.S.C. 154(b) by 380 days.

(21) Appl. No.: 17/880,565

(22) Filed: Aug. 3, 2022

(65) Prior Publication Data

US 2022/0376830 A1 Nov. 24, 2022

Related U.S. Application Data

(63) Continuation of application No. PCT/CN2021/074382, filed on Jan. 29, 2021.

(30) Foreign Application Priority Data

Feb. 5, 2020 (CN) .......................... 202010081044.7

(51) Int. Cl.
| | | |
|---|---|---|
| *H04L 1/08* | (2006.01) | |
| *H04W 16/28* | (2009.01) | |
| *H04W 72/0446* | (2023.01) | |
| *H04W 72/21* | (2023.01) | |

(52) U.S. Cl.
CPC ............... *H04L 1/08* (2013.01); *H04W 16/28* (2013.01); *H04W 72/0446* (2013.01); *H04W 72/21* (2023.01)

(58) Field of Classification Search
None
See application file for complete search history.

(56) References Cited

U.S. PATENT DOCUMENTS

| | | | | |
|---|---|---|---|---|
| 2017/0180098 | A1* | 6/2017 | You | H04W 74/04 |
| 2019/0306922 | A1* | 10/2019 | Xiong | H04W 72/21 |
| 2020/0154427 | A1* | 5/2020 | Choi | H04W 72/21 |

(Continued)

FOREIGN PATENT DOCUMENTS

| | | |
|---|---|---|
| CN | 108632191 A | 10/2018 |
| CN | 109672511 A | 4/2019 |

(Continued)

OTHER PUBLICATIONS

International Search Report issued in corresponding International Application No. PCT/CN2021/074382, mailed Apr. 22, 2021, 4 pages.

(Continued)

*Primary Examiner* — Clemence S Han
(74) *Attorney, Agent, or Firm* — IPX PLLC

(57) ABSTRACT

A Physical Uplink Control Channel (PUCCH) transmission method and apparatus, a device and a medium are provided. The PUCCH transmission method includes: acquiring PUCCH repeat transmission information; determining a resource location of each PUCCH repeat transmission; and transmitting the PUCCH based on the repeat transmission information and the resource location.

12 Claims, 10 Drawing Sheets

(56) References Cited

U.S. PATENT DOCUMENTS

| | | | |
|---|---|---|---|
| 2020/0221448 A1* | 7/2020 | Park | H04W 80/08 |
| 2020/0404692 A1* | 12/2020 | Yin | H04L 1/1887 |
| 2022/0030443 A1* | 1/2022 | Chen | H04W 72/21 |
| 2022/0353024 A1* | 11/2022 | Yin | H04L 1/08 |

FOREIGN PATENT DOCUMENTS

| | | | |
|---|---|---|---|
| CN | 110611958 A | 12/2019 | |
| CN | 111417204 A | 7/2020 | |
| CN | 113228780 A | 8/2021 | |
| EP | 3937563 A1 | 1/2022 | |
| WO | 2018203657 A1 | 11/2018 | |
| WO | 2019160846 A1 | 8/2019 | |
| WO | 2019214468 A1 | 11/2019 | |
| WO | 20200017059 A1 | 1/2020 | |
| WO | 2020227070 A2 | 11/2020 | |
| WO | 2021066015 A1 | 4/2021 | |

OTHER PUBLICATIONS

Extended European Search Report issued in related European Application No. 21750958.7, mailed May 30, 2023, 12 pages.
Qualcomm Incorporated "Long PUCCH over multiple slots", 3GPP TSG-RAN WG1 Meeting 91, R1-1720684, Nov. 2017, 3 pages.
CAICT, "Discussion on URLLC reliability robustness enhancement with multi-TRP panel", 3GPP TSG-RAN WG1 Meeting 96, R1-1902926, Feb. 2019, 3 pages.
First Office Action issued in related Chinese Application No. 202010081044.7, mailed Aug. 30, 2022, 16 pages.
Qualcomm Incorporated "Long PUCCH design considerations", 3GPP TSG-RAN WG1 # 89, R1-1708620, May 2017, 3 pages.
Office Action issued in related Korean Application No. 10-2022-7029149, mailed Dec. 17, 2024, 19 pages.
CAICT, "Potential enhancements to UCI for URLLC", 3GPP TSG RAN WG1 Ad Hoc Meeting 1901, R1-1901130, Jan. 2019, 4 pages.
Intel Corporation, "Remaining details of UL data transmission procedures in NR", 3GPP TSG RAN WG1 Meeting 91, R1-1720097, Nov. 2017, 10 pages.
Panasonic, "Discussion on UCI enhancement for URLLC", 3GPP TSG RAN WG1 #99, R1-1912748, Nov. 2019, 8 pages.
CATT, "Considerations on multi-TRP/panel transmission", 3GPP TSG RAN WG1 #98bis, R1-1910349, Oct. 2019, 25 pages.
Office Action issued in related European Application No. 21750958.7, mailed Mar. 20, 2025, 9 pages.

* cited by examiner

PHYSICAL UPLINK CONTROL CHANNEL TRANSMISSION METHOD AND APPARATUS, DEVICE AND MEDIUM

CROSS-REFERENCE TO RELATED APPLICATIONS

This application is a continuation of International Application No. PCT/CN2021/074382, filed on Jan. 29, 2021, which claims priority to Chinese Patent Application No. 202010081044.7 filed in China on Feb. 5, 2020. The entire contents of each of the above-referenced applications are expressly incorporated herein by reference.

TECHNICAL FIELD

The present disclosure relates to the technical field of mobile communications, and in particular, to a physical uplink control channel transmission method and apparatus, a device and a medium.

BACKGROUND

Compared with the previous mobile communication system, the future mobile communication system needs to adapt to more diverse scenarios and service requirements. Main scenarios of New Radio (NR) include: an enhanced Mobile Broadband (eMBB), an Ultra-high reliable ultra-low delay communication (URLLC), and a massive Machine Type of Communication (mMTC). These scenarios require high reliability, low delay, a large bandwidth, wide coverage and the like of systems. To meet services with different requirements and different application scenarios, Physical Uplink Control Channel (PUCCH) with different lengths are introduced: a short PUCCH format (PUCCH of 1-2 Orthogonal Frequency Division Multiplexing (OFDM) symbols) and a long PUCCH format (PUCCH of 4-14 OFDM symbols).

To enhance coverage, the long PUCCH in NR supports repeat transmission of PUCCH, but the existing PUCCH repeat transmission has insufficient flexibility, resulting in that the PUCCH performance is limited.

SUMMARY

Embodiments of the present disclosure provide a physical uplink control channel transmission method and apparatus, a device and a medium, so that the resource location of each PUCCH transmission of PUCCH repeat transmission can be determined, the PUCCH can be transmitted based on the determined resource location, and the flexibility of the PUCCH repetition can be improved.

According to one aspect, the embodiments of the present disclosure provide a physical uplink control channel transmission method, including acquiring PUCCH repeat transmission information;

determining a resource location of each PUCCH repeat transmission; and transmitting the PUCCH based on the repeat transmission information and the resource location.

According to another aspect, the embodiments of the present disclosure provide a physical uplink control channel transmission apparatus, including:

an acquisition module, configured to acquire PUCCH repeat transmission information;

a determination module, configured to determine a resource location of each PUCCH repeat transmission, and a transmission module, configured to transmit the PUCCH based on the repeat transmission information and the resource location.

According to yet another aspect, the embodiments of the present disclosure provide a terminal device, including: a memory, a processor, and a computer program stored in the memory and capable of running on the processor, wherein when the processor executes the computer program, the physical uplink control channel transmission method according provided by the embodiments of the present disclosure is implemented.

According to yet another aspect, the embodiments of the present disclosure provide a computer readable storage medium, wherein the computer readable storage medium stores a computer program, and when the computer program is executed by a processor, the physical uplink control channel transmission method according provided by the embodiments of the present disclosure is implemented.

According to the physical uplink control channel transmission method according provided by the embodiments of the present disclosure, the PUCCH is transmitted based on the repeat transformation information and the determined resource location, so that the flexibility of the PUCCH repeat transmission is improved.

BRIEF DESCRIPTION OF DRAWINGS

To describe the technical solutions in the embodiments of the present disclosure more clearly, the following briefly describes the accompanying drawings required to be used in the embodiments of the present disclosure. A person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

The embodiments of the present disclosure provide a PUCCH transmission method and apparatus, a device and a medium. The PUCCH transmission method provided by the embodiments of the present disclosure is described below in detail.

Figure 1:
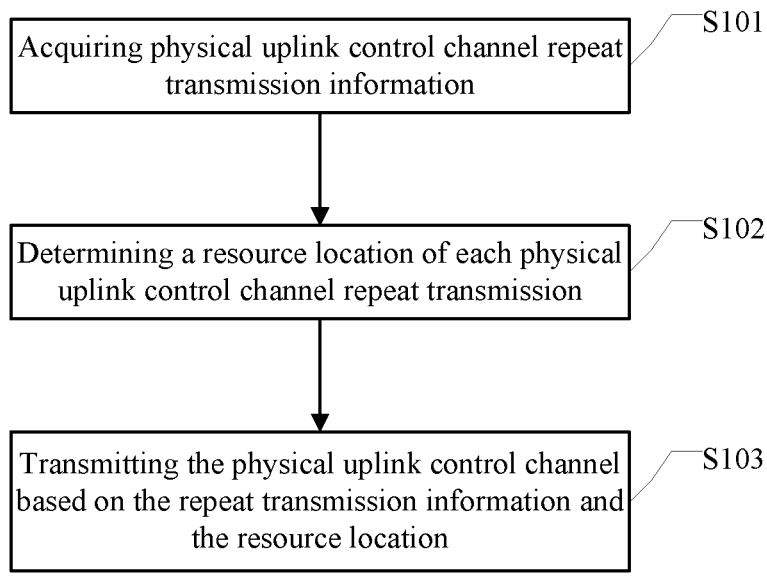
FIG. 1 is a schematic flowchart of a PUCCH transmission method according to an embodiment of the present disclosure.

FIG. 1 is a schematic flowchart of a PUCCH transmission method according to an embodiment of the present disclosure. The PUCCH transmission method may include:

S101: acquiring PUCCH repeat transmission information;

S102: determining a resource location of each PUCCH repeat transmission; and

S103: transmitting the PUCCH based on the repeat transmission information and the resource location.

In some possible implementations of the embodiments of the present disclosure, the PUCCH may be a long PUCCH, or may be a short PUCCH.

According to the physical uplink control channel transmission method provided by the embodiments of the present disclosure, the resource location of each PUCCH repeat transmission can be determined, the PUCCH is transmitted based on the determined the resource location, and the flexibility of the PUCCH repeat transmission is improved.

In some possible implementations of the embodiments of the present disclosure, the repeat transmission information may be configured by Radio Resource Control (RRC) or indicated by Downlink Control Information (DCI).

In some possible implementations of the embodiments of the present disclosure, the repeat transmission information may include: the total number of repeat transmissions.

In some possible implementations of the embodiments of the present disclosure, the resource location of the first PUCCH transmission may be determined according to a start symbol of the PUCCH and the number of symbols; and the resource location of other times of PUCCH transmission may be determined according to a first preset resource location determining rule.

In some possible implementations of the embodiments of the present disclosure, the first preset resource location determining rule may include: the number of the PUCCH repeat transmissions within one time unit is the total number of the repeat transmissions, and multiple PUCCH repeat transmissions are mapped on consecutive OFDM symbols, wherein the time unit may be a slot or a sub-slot.

One sub-slot includes one or more OFDM symbols, for example, one sub-slot may include 1 to 13 OFDM symbols, for example, one sub-slot may include 2 or 7 OFDM symbols.

Compared with the prior art, each PUCCH repeat transmission only can be in different slots, and the transmission delay is large. By the embodiments of the present disclosure, the limitation that the PUCCH repeat transmission only can be in different slots is overcome, the determined resource location of the PUCCH repeat transmission may be in the same time unit, that is, the determined resource location of the PUCCH repeat transmission may be in the same slot, and the delay can be reduced.

Figure 2:
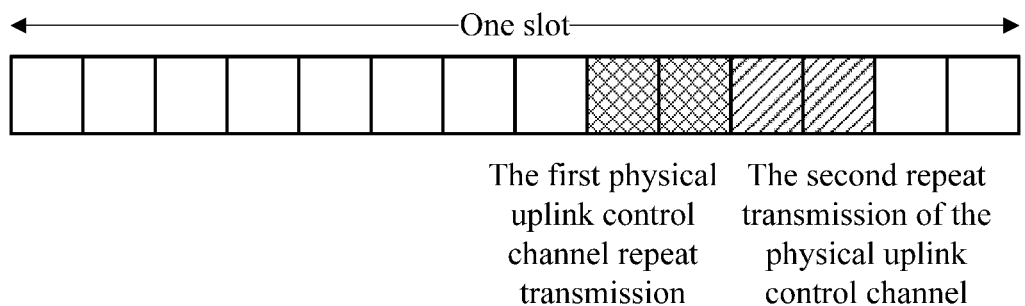
FIG. 2 is a first schematic diagram of a resource location of a PUCCH repeat transmission according to an embodiment of the present disclosure.

Taking the slot as an example, it is assumed that the total number of the repeat transmissions is two. The resource location of each PUCCH repeat transmission is shown in FIG. 2. FIG. 2 is a first schematic diagram of a resource location of a PUCCH repeat transmission according to an embodiment of the present disclosure.

It can be seen from FIG. 2 that multiple PUCCH repeat transmissions are mapped on consecutive OFDM symbols.

In some possible implementations of the embodiments of the present disclosure, the first preset resource location determining rule further may include: the number of the PUCCH repeat transmissions within one time unit is the total number of the repeat transmissions, and an interval between two adjacent PUCCH transmissions is a first preset interval. In some possible implementations of the embodiments of the present disclosure, the first preset interval may be configured by a high layer (for example, configured by RRC), or indicated by DCI, or determined according to an implicit rule, or pre-defined by a protocol.

In some possible implementations of the embodiments of the present disclosure, the first preset interval needs to meet the time of switching beams.

In some possible implementations of the embodiments of the present disclosure, the first preset interval is related to the capability of the terminal or a sub-carrier interval, wherein the time unit may be a slot or a sub-slot.

The determining the first preset interval according to the implicit rule includes but is not limited to: determining the first preset interval according to the device capability of the terminal device; and determining the first preset interval according to the time of switching spatial relationship information by the terminal device.

Figure 3:
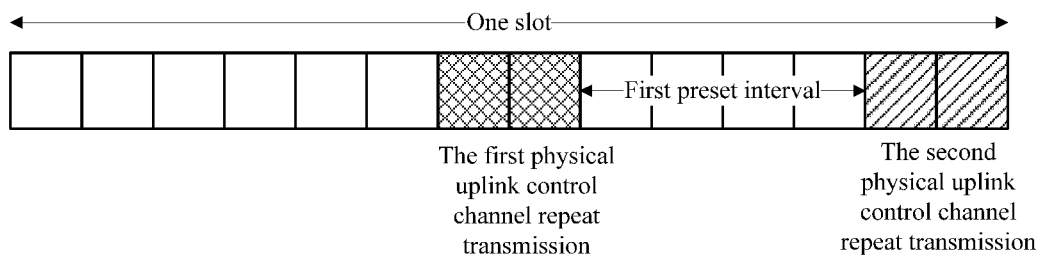
FIG. 3 is a second schematic diagram of a resource location of a PUCCH repeat transmission according to an embodiment of the present disclosure.

Taking the slot as an example, it is assumed that the total number of the repeat transmissions is two. The resource location of each PUCCH repeat transmission is shown in FIG. 3. FIG. 3 is a second schematic diagram of a resource location of a PUCCH repeat transmission according to an embodiment of the present disclosure.

It can be seen from FIG. 3 that an interval between the two adjacent PUCCH transmissions is a first preset interval.

In some possible implementations of the embodiments of the present disclosure, the first preset resource location determining rule may further include: the number of the PUCCH repeat transmissions within one time unit is the total number of the repeat transmissions, and multiple PUCCH repeat transmissions are mapped on consecutive available uplink OFDM symbols, wherein the time unit may be a slot or a sub-slot.

In one embodiment, the available uplink OFDM symbol refers to at least one of semi-statically configured uplink symbols and flexible symbols; in another embodiment, the available uplink OFDM symbol refers to at least one of dynamically configured uplink symbols and flexible symbols; and in another embodiment, the available uplink OFDM symbol refers to uplink symbols for transmitting the PUCCH, for example, the available uplink OFDM symbol is determined according to a semi-static or dynamic slot format configuration and/or other configurations.

Figure 4:
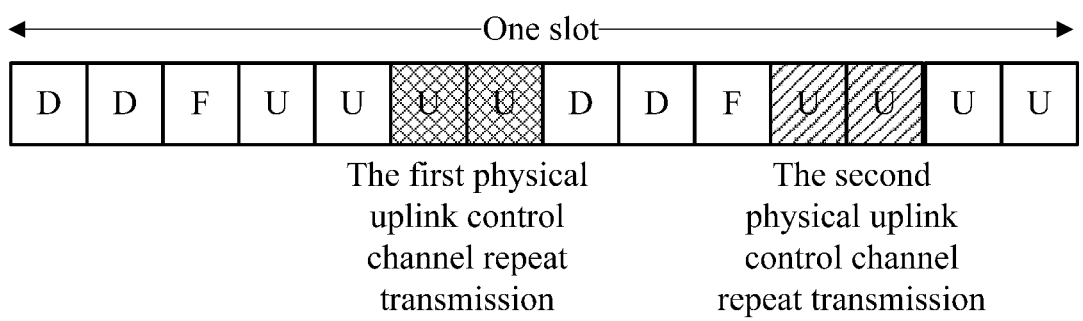
FIG. 4 is a third schematic diagram of a resource location of a PUCCH repeat transmission according to an embodiment of the present disclosure.

Taking the slot as an example, it is assumed that the total number of the repeat transmissions is two. Assuming that the PUCCH may be transmitted on the uplink or flexible symbol in the semi-static configuration, that is, the available uplink OFDM symbol may be on the uplink or flexible symbol in the semi-static configuration, the PUCCH should be mapped on consecutive non-downlink symbols. The resource location of each PUCCH repeat transmission is shown in FIG. 4. FIG. 4 is a third schematic diagram of a resource location of a PUCCH repeat transmission according to an embodiment of the present disclosure.

In FIG. 4, D corresponds to a semi-statically configured downlink symbol, F corresponds to a semi-statically configured flexible symbol, and U corresponds to a semi-statically configured uplink symbol.

It can be seen from FIG. 4 that multiple PUCCH repeat transmissions are mapped on consecutive available uplink OFDM symbols.

In some possible implementations of the embodiments of the present disclosure, the repeat transmission information may include: the number of the PUCCH repeat transmissions within one sub-slot is only one, and the resource location of other times of PUCCH transmission and the resource location of the first PUCCH transmission are the same in the sub-slot.

Compared with the prior art, each PUCCH repeat transmission only can be in different slots, and the transmission delay is large. By the embodiments of the present disclosure, the limitation that the PUCCH repeat transmission only can be in different slots is overcome, the determined resource location of the PUCCH repeat transmission may be in multiple sub-slots and the plurality of sub-slots may be located in the same slot, that is, the determined resource location of the PUCCH repeat transmission may be in the same slot, and the delay can be reduced.

Figure 5:
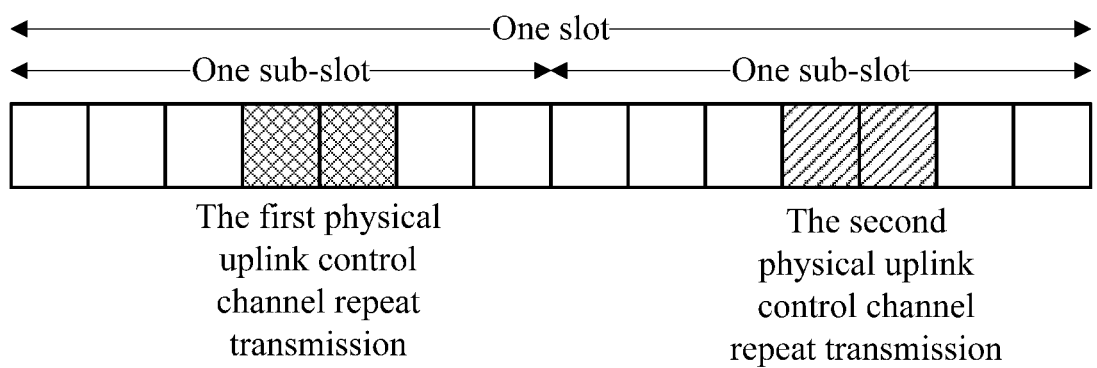
FIG. 5 is a fourth schematic diagram of a resource location of a PUCCH repeat transmission according to an embodiment of the present disclosure.

It is assumed that the total number of the repeat transmissions is two. The resource location of each PUCCH repeat transmission is shown in FIG. 5. FIG. 5 is a fourth schematic diagram of a resource location of a PUCCH repeat transmission according to an embodiment of the present disclosure.

In some implementations of the embodiments of the present disclosure, multiple sub-slots for the PUCCH repeat transmission are consecutive or inconsecutive in time domain.

For example, for paired frequency spectra, the plurality of sub-slots of the PUCCH transmission may be multiple consecutive sub-slots of the sub-slots starting from the indicated start sub-slot; or for unpaired frequency spectra, the plurality of sub-slots of the PUCCH transmission may be multiple consecutive or inconsecutive sub-slots of the sub-slots starting from the indicated start sub-slot. Furthermore, each sub-slot meets the following conditions: the OFDM symbol corresponding to the PUCCH start symbol is the number of available uplink symbols, for example, the uplink symbol or the flexible symbol, and a synchronous signal block is not configured on the flexible symbol; and the number of the consecutive available uplink symbols starting from the start symbol is not less than the number of the symbols of the PUCCH.

In some possible implementations of the embodiments of the present disclosure, the repeat transmission information may include: the number of the time units of the PUCCH repeat transmissions and the number of the PUCCH repeat transmissions in each time unit.

In some possible implementations of the embodiments of the present disclosure, the resource location of the first PUCCH transmission in any one of multiple time units according to a start symbol of the PUCCH and the number of symbols; the resource location of other times of PUCCH transmission in the time unit is determined according to a second preset resource location determining rule; and it is determined that the resource location of the PUCCH transmission in other time units is as same as the resource location of the PUCCH transmission in the slot or sub-slot, wherein the time unit may be a slot or a sub-slot.

Compared with the prior art, each PUCCH repeat transmission only can be in different slots, and the transmission delay is large. By the embodiments of the present disclosure, the limitation that the PUCCH repeat transmission only can be in different slots is overcome, the determined resource location of the PUCCH repeat transmission may be in the same time unit, that is, the determined resource location of the PUCCH repeat transmission may be in the same slot, and the delay can be reduced.

Figure 6:
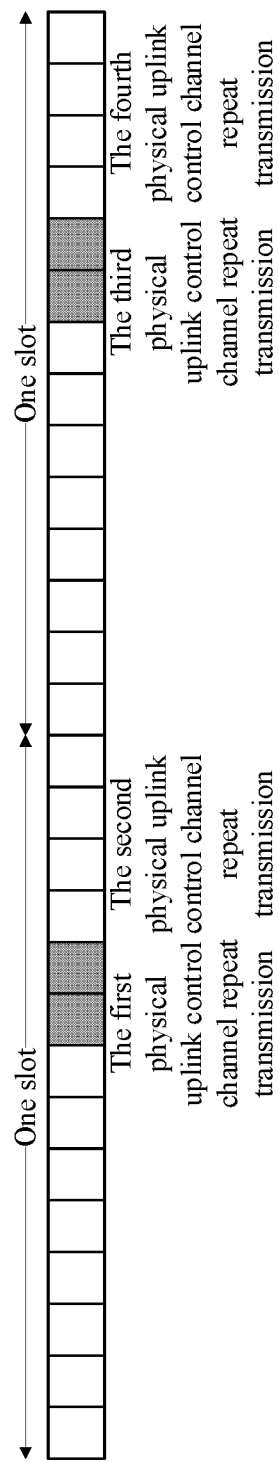
FIG. 6 is a fifth schematic diagram of a resource location of a PUCCH repeat transmission according to an embodiment of the present disclosure.

In some possible implementations of the embodiments of the present disclosure, the second preset resource location determining rule may be: multiple PUCCH repeat transmissions are mapped on consecutive OFDM symbols, Taking the slot as an example, assuming that the number of the slots of the PUCCH repeat transmissions is 2 and the number of the PUCCH repeat transmission in each slot is 2, the total number of the repeat transmissions is four. The resource location of each PUCCH repeat transmission is shown in FIG. 6. FIG. 6 is a fifth schematic diagram of a resource location of a PUCCH repeat transmission according to an embodiment of the present disclosure.

In some possible implementations of the embodiments of the present disclosure, the second preset resource location determining rule may be: an interval between two adjacent PUCCH transmissions is a second preset interval.

In some possible implementations of the embodiments of the present disclosure, the second preset interval may be configured by a high layer, or indicated by DCI, or determined according to an implicit rule, or pre-defined by a protocol.

Figure 7:
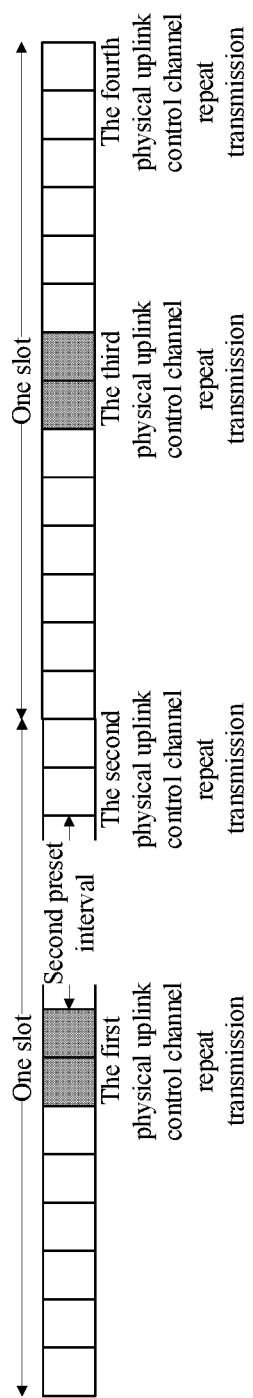
FIG. 7 is a sixth schematic diagram of a resource location of a PUCCH repeat transmission according to an embodiment of the present disclosure.

Taking the slot as an example, assuming that the number of the slots of the PUCCH repeat transmissions is 2 and the number of the PUCCH repeat transmission in each slot is 2, the total number of the repeat transmissions is four. The resource location of each PUCCH repeat transmission is shown in FIG. 7. FIG. 7 is a sixth schematic diagram of a resource location of a PUCCH repeat transmission according to an embodiment of the present disclosure.

In some possible implementations of the embodiments of the present disclosure, the second preset resource location determining rule may be: multiple PUCCH repeat transmissions are mapped on consecutive available uplink OFDM symbols.

Figure 8:
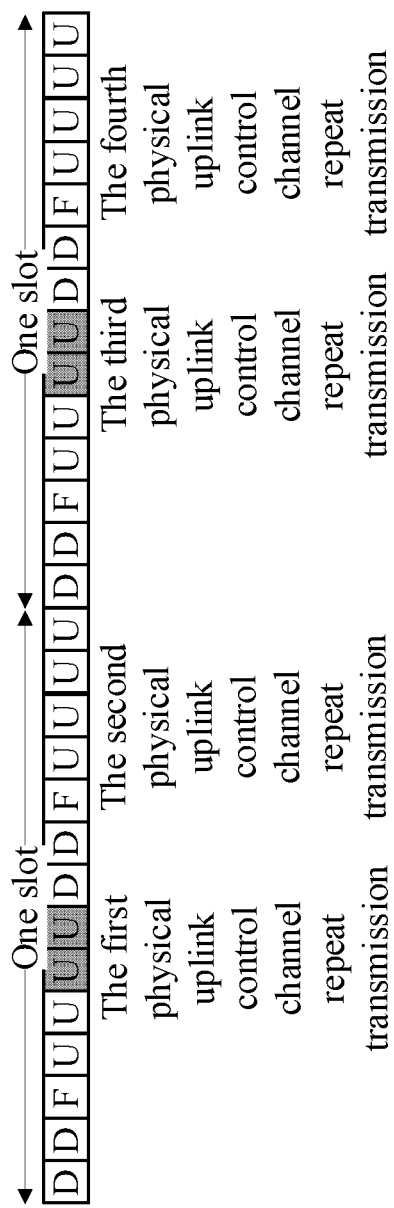
FIG. 8 is a seventh schematic diagram of a resource location of a PUCCH repeat transmission according to an embodiment of the present disclosure.

Taking the slot as an example, assuming that the number of the slots of the PUCCH repeat transmissions is 2 and the number of the PUCCH repeat transmission in each slot is 2, the total number of the repeat transmissions is four. The resource location of each PUCCH repeat transmission is shown in FIG. 8. FIG. 8 is a seventh schematic diagram of a resource location of a PUCCH repeat transmission according to an embodiment of the present disclosure.

In some possible implementations of the embodiments of the present disclosure, when the PUCCH is mapped on consecutive OFDM symbols or consecutive available uplink OFDM symbols, or an interval is present between two adjacent PUCCH transmissions, the PUCCH may be within different time units.

Figure 9:
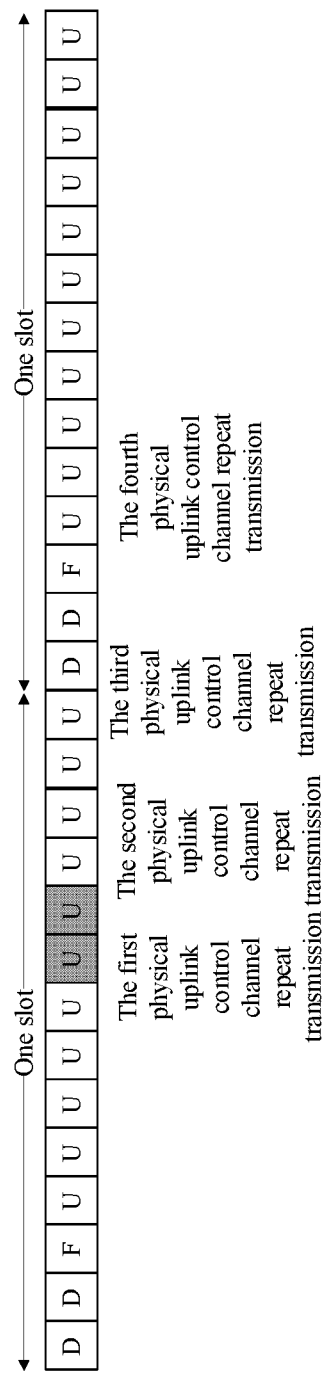
FIG. 9 is an eighth schematic diagram of a resource location of a PUCCH repeat transmission according to an embodiment of the present disclosure.

Taking the case where the time unit is a slot as an example, it is assumed that the total number of the repeat transmissions is four. The resource location of each PUCCH repeat transmission is shown in FIG. 9. FIG. 9 is an eighth schematic diagram of a resource location of a PUCCH repeat transmission according to an embodiment of the present disclosure.

In FIG. 9, D corresponds to a semi-statically configured downlink symbol, F corresponds to a semi-statically configured flexible symbol, and U corresponds to a semi-statically configured uplink symbol. Assuming that the PUCCH repeat transmissions are mapped on consecutive semi-statically configured uplink symbols or flexible symbols, X flexible symbols or uplink symbols behind a downlink symbol may not be mapped (assuming that X=1 in the figure). In one implementation manner, one PUCCH repeat transmission cannot cross a slot boundary.

It can be seen from FIG. 9 that the PUCCH is transmitted repeatedly for three times within a first slot, and the PUCCH is transmitted repeatedly for one time within a second slot.

Compared with the prior art, each PUCCH repeat transmission only can be in different slots, and the transmission delay is large. By the embodiments of the present disclosure, the limitation that the PUCCH repeat transmission only can be in different slots is overcome, the determined resource location of the PUCCH repeat transmission may be in the same time unit, and the delay can be reduced.

In some possible implementations of the embodiments of the present disclosure, different pieces of spatial relationship information may be used during PUCCH repeat transmission.

Compared with the prior art, the PUCCH is repeatedly transmitted by using the same spatial relationship, and the PUCCH transmission reliability is poor. According to the embodiments of the present disclosure, the PUCCH is repeatedly transmitted by using different pieces of spatial relationship information, so the limitation of using the same spatial relationship information to repeatedly transmit the PUCCH in the prior art is overcome, and the PUCCH transmission reliability is improved.

In some possible implementations of the embodiments of the present disclosure, different pieces of spatial relationship information may be: multiple pieces of spatial relationship information configured and activated for the PUCCH repeat transmission, or may be: one or more spatial relationship information lists configured or activated for the PUCCH repeat transmission, and multiple pieces of spatial relationship information included in one spatial relationship information list of the one or more configured and activated spatial relationship information list.

In some possible implementations of the embodiments of the present disclosure, the spatial relationship associated with the PUCCH transmission is related to the corresponding downlink transmission, for example, the spatial relationship information associated with the PUCCH is determined according to a Control Resource Set (CORESET) or a CORESET pool index where the DCI corresponding to the PUCCH is located, or the PUCCH is associated with multiple CORESET or CORESET pool index.

In some possible implementations of the embodiments of the present disclosure, the spatial relationships used in any two PUCCH repeat transmissions are different.

In some possible implementations of the embodiments of the present disclosure, the spatial relationships used in two PUCCH transmissions of the PUCCH repeat transmissions are different.

In some possible implementations of the embodiments of the present disclosure, for each PUCCH repeat transmission, the spatial relationship information used in each PUCCH repeat transmission may be determined; and the PUCCH is transmitted by using the determined spatial relationship information.

In some possible implementations of the embodiments of the present disclosure, the spatial relationship information used in each PUCCH repeat transmission may be determined according to a cyclic mode of a spatial relationship information.

It is assumed that RRC is configured with 10 pieces of spatial relationship information, and a Media Access Control (MAC) Control Element (CE) activates 5 pieces of spatial relationship information. For example, the five active pieces of spatial relationship information are respectively: spatial relationship information 1, spatial relationship information 2, spatial relationship information 3, spatial relationship information 4 and spatial relationship information 5.

When the PUCCH is repeatedly transmitted, the spatial relationship information used in each transmission may be different. For example, the terminal device starts from the spatial relationship information 1 according to the activated spatial relationship information, then the spatial relationship information 2, . . . , until the spatial relationship information 5. If the number of the activated spatial relationship information is less than the number of the PUCCH repeat transmissions, the terminal device continues from the spatial relationship information 1 circularly.

It is assumed that the RRC is configured with one or more spatial relationship information lists, each spatial relationship information list includes one or more pieces of spatial relationship information. If the RRC is only configured with one spatial relationship information list, the spatial relationship information in the spatial relationship information list is used during PUCCH repeat transmission. If the RRC is configured with multiple spatial relationship information lists, one spatial relationship information list is activated for the PUCCH through the MAC CE, and the spatial relationship information in the activated spatial relationship information list is used during PUCCH repeat transmission.

When the PUCCH is repeated transmitted, the spatial relationship information used in each transmission may be different. For example, the terminal device starts from the first spatial relationship information in the list according to the spatial relationship information sequence in the list, then the second spatial relationship information in the list, . . . , until the last spatial relationship information in the list. If the number of the spatial relationship information in the list is less than the number of the PUCCH repeat transmissions, the terminal device continues from the first spatial relationship information circularly in the list.

The case where the number of slots of the PUCCH repeat transmission is 2, the number of the PUCCH repeat transmissions in each slot is 2 and the three pieces of spatial relationship information (the spatial relationship information 1, the spatial relationship information 2 and the spatial relationship information 3) is taken as an example.

Figure 10:
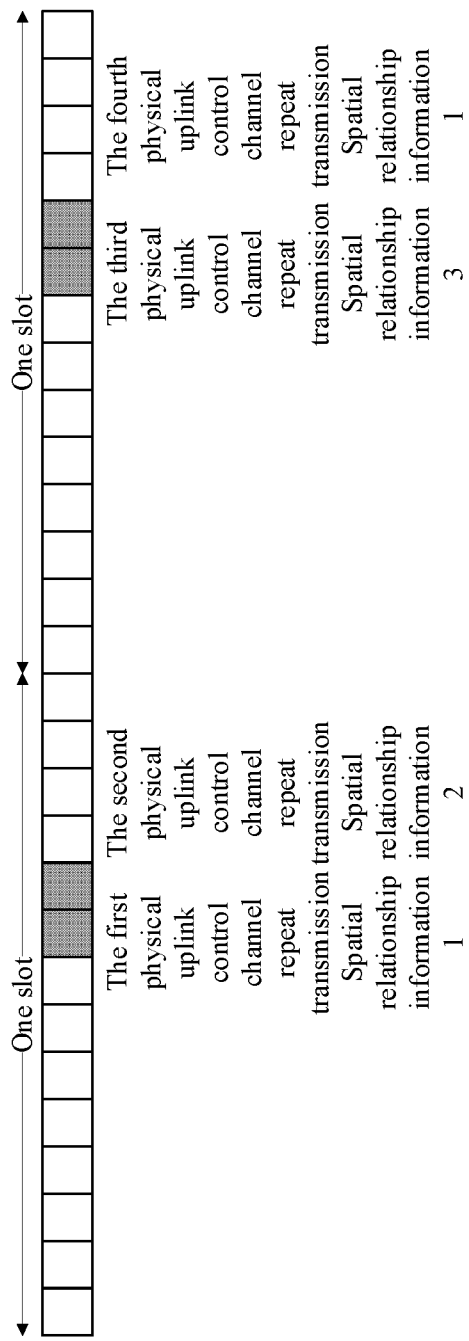
FIG. 10 is a schematic diagram of spatial relationship information used in a PUCCH repeat transmission according to an embodiment of the present disclosure.

The PUCCH repeat transmission and the spatial relationship information used at each time are shown in FIG. 10. FIG. 10 is a schematic diagram of spatial relationship information used in a PUCCH repeat transmission according to an embodiment of the present disclosure.

The first PUCCH repeat transmission uses the spatial relationship information 1, the second PUCCH repeat transmission uses the spatial relationship information 2, the third PUCCH repeat transmission uses the spatial relationship information 3, and the fourth PUCCH repeat transmission uses the spatial relationship information 1.

In some possible implementations of the embodiments of the present disclosure, when the terminal device is not configured with PUCCH spatial relationship information, in some cases (for example, when the terminal device reports that there is no uplink beam scanning, a road loss reference signal and PUCCH spatial relationship information are not configured in the PUCCH power control, and the PUCCH is enabled to default the beam), the spatial relationship information of the PUCCH is as same as the spatial relationship information received by the PDCCH sent by the CORESET with the minimum identification (ID) in the activated Downlink (DL) Bandwidth Part (BWP) on a Primary cell (PCell).

In some embodiments, the spatial relationship information of the PUCCH is as same as space setting received by the PDCCH sent by the CORESET with the minimum ID in the CORESET of the same CORESET pool index corresponding to the PUCCH in the activated DL BWP on the PCell. The PDCCH reception is associated with M (M>1) pieces of spatial relationship information, the PUCCH transmission is associated with M space settings corresponding to the PDCCH.

In some possible implementations of the embodiments of the present disclosure, the space setting of the PUCCH (or the spatial relationship information) is related to the space setting (or Quasi Co-Location (QCL) type D or Transmission Configuration Indicator (TCI) state) of the CORESET associated with the PUCCH. For example, the CORESET (for example, the space setting received by the PDCCH in the CORESET with the minimum ID in the at least one CORESET associated with each CORESET pool index) associated with the PUCCH is determined through high-layer configuration or protocol stipulation, and the PDCCH reception in each CORESET is associated with one or more space settings. The space setting of the PUCCH is related to the space setting associated with the plurality of CORESET, so the PUCCH is associated with multiple pieces of spatial relationship information.

In some possible implementations of the embodiments of the present disclosure, the space setting of the PUCCH is related to the space setting (QCL type D or TCI state) of a Physical Downlink Shared Channel (PDSCH).

For example, the MAC CE receives and activates multiple (at most 8, TCI) TCI states for the PDSCH, and each activated code point corresponds to one or two TCI states. When a time interval between the PDSCH and the PDCCH scheduled by the PDSCH is less than a certain threshold, the terminal device will assume that the TCI state (the default TCI state of the PDSCH) of a PDSCH Demodulation Reference Signal (DMRS) (the PDSCH and the PDSCH DMRS are of QCL) is the TCI state corresponding to the minimum code point including two different TCI states in the TCI code points activated by the MAC CE.

The space setting of the PUCCH may be as same as the default space setting of the PDSCH, so the PUCCH is associated with multiple pieces of spatial relationship information.

For the PUCCH transmission, the RRC is configured with the number of the repeat transmissions, for example, the number of slots of the PUCCH transmission is configured through an RRC parameter nrofSlots, which means the total number N of the PUCCH repeat transmissions.

When N>1, the terminal device repeatedly transmits the PUCCH and Uplink Control Information (UCI) borne by the PUCCH within N slots; the PUCCH transmission within each slot in the N slots has the same number of symbols; the PUCCH transmission within each slot in the N slots has the same start symbol; and the PUCCH transmission within each slot in the N slots may have different pieces of spatial relationship information, that is, the PUCCH transmission uses different spatial relationship information.

Figure 11:
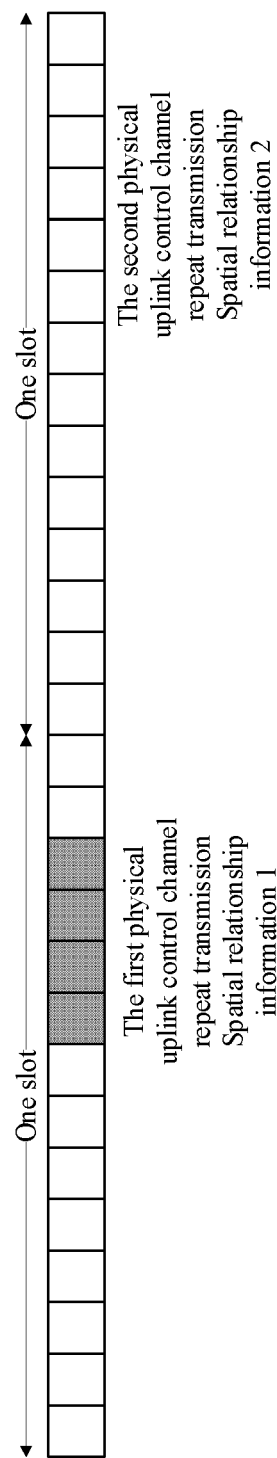
FIG. 11 is another schematic diagram of spatial relationship information used in a PUCCH repeat transmission according to an embodiment of the present disclosure.

Taking the case where N is 2 as an example, the spatial relationship information used in the PUCCH repeat transmission is shown in FIG. 11. FIG. 11 is another schematic diagram of spatial relationship information used in a PUCCH repeat transmission according to an embodiment of the present disclosure.

It can be seen from FIG. 11 that the PUCCH transmission within each slot in two slots has the same number of symbols; the PUCCH transmission within each slot in two slots has the same start symbol; the PUCCH transmission in the first slot uses the spatial relationship information 1, and the PUCCH transmission in the second slot uses the spatial relationship information 2, that is, the PUCCH transmission within each slot in two slots uses different pieces of spatial relationship information.

For the PUCCH transmission, RRC or DCI indicates the number N of the PUCCH repeat transmissions, and the RRC is configured with a sub-slot.

When N>1, the terminal device repeatedly transmits the PUCCH within N sub-slots and the UCI borne by the PUCCH, the PUCCH transmission within each sub-slot in the N sub-slots has the same number of symbols, and the PUCCH transmission within each sub-slot in the N sub-slots has the same start symbol.

The PUCCH transmission within each sub-slot in the N sub-slots may have different pieces of spatial relationship information, that is, the PUCCH transmission may use different pieces of spatial relationship information.

In some possible implementations of the embodiments of the present disclosure, when the resource locations of multiple PUCCH repeat transmissions are located at different slots or sub-slots, each PUCCH repeat transmission is only in one slot or sub-slot (that is, one PUCCH transmission cannot cross a slot or sub-slot boundary).

Figure 12:
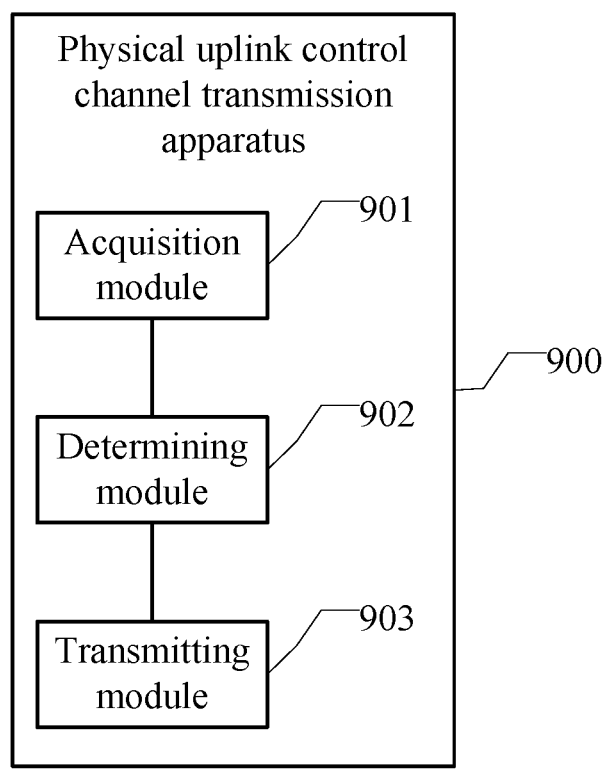
FIG. 12 is a schematic structural diagram of a physical uplink control channel transmission apparatus according to an embodiment of the present disclosure.

Corresponding to the foregoing method embodiment, the embodiments of the present disclosure further provide a physical uplink control channel transmission apparatus. As shown in FIG. 12, FIG. 12 is a schematic structural diagram of a physical uplink control channel transmission apparatus according to an embodiment of the present disclosure. The physical uplink control channel transmission apparatus 900 may include:

an acquisition module 901, configured to acquire PUCCH repeat transmission information;

a determination module 902, configured to determine a resource location of each PUCCH repeat transmission; and a transmission module 903, configured to transmit the PUCCH based on the repeat transmission information and the resource location.

In some possible implementations of the embodiments of the present disclosure, the repeat transmission information may include the total number of repeat transmissions. The determining module 902 may be configured to:

determine the resource location of the first PUCCH transmission according to a start symbol of the PUCCH and the number of symbols; and determine the resource location of other times of PUCCH transmission according to a first preset resource location determining rule.

In some possible implementations of the embodiments of the present disclosure, the first preset resource location determining rule includes: the number of PUCCH repeat transmissions within one time unit is total number of the repeat transmissions; and the first preset resource location determining rule further includes any one of the followings:
- multiple PUCCH repeat transmissions are mapped on consecutive OFDM symbols;
- an interval between the two adjacent PUCCH transmissions is a first preset interval; and
- multiple PUCCH repeat transmissions are mapped on consecutive available uplink OFDM symbols.

In some possible implementations of the embodiments of the present disclosure, the first preset interval is configured by a high layer, or indicated by DCI, or determined according to an implicit rule, or pre-defined by a protocol.

In some possible implementations of the embodiments of the present disclosure, the first preset resource location determining rule includes: the number of the PUCCH repeat transmissions within one sub-slot is only one, and the resource location of other times of PUCCH transmission and the resource location of the first PUCCH transmission are the same in the time unit.

In some implementations of the embodiments of the present disclosure, multiple sub-slots for the PUCCH repeat transmission are consecutive or inconsecutive in time domain.

In some possible implementations of the embodiments of the present disclosure, the repeat transmission information may include the number of the time units of the PUCCH repeat transmissions and the number of the PUCCH repeat transmissions in each time unit. The determining module 902 may be configured to:
- determine the resource location of the first PUCCH transmission within any one of multiple time units according to a start symbol of the PUCCH and the number of symbols;
- determine the resource location of other times of PUCCH transmission within the time unit according to a second preset resource location determining rule; and
- determine that the resource location of the PUCCH transmission within other time units is as same as the resource location of the PUCCH transmission within the time unit.

In some possible implementations of the embodiments of the present disclosure, the second preset resource location determining rule includes any one of the followings:
- multiple PUCCH repeat transmissions are mapped on consecutive OFDM symbols;
- an interval between the two adjacent PUCCH transmissions is a second preset interval; and
- multiple PUCCH repeat transmissions are mapped on consecutive available uplink OFDM symbols.

In some possible implementations of the embodiments of the present disclosure, the second preset interval is configured by a high layer, or indicated by DCI, or determined according to an implicit rule, or pre-defined by a protocol.

In some possible implementations of the embodiments of the present disclosure, the time unit includes a slot or a sub-slot.

In some possible implementations of the embodiments of the present disclosure, the transmission module 903 may be configured to:
- transmit the PUCCH by using different pieces of spatial relationship information based on the repeat transmission information and the resource location.

In some possible implementations of the embodiments of the present disclosure, different pieces of spatial relationship information may include:
- multiple pieces of spatial relationship information configured and activated for the PUCCH repeat transmission; and
- one or more spatial relationship information lists configured or activated for the PUCCH repeat transmission, and multiple pieces of spatial relationship information included in one spatial relationship information list of the one or more configured and activated spatial relationship information list.

In some possible implementations of the embodiments of the present disclosure, the transmission module 903 may be configured to:
- for each PUCCH repeat transmission, determine spatial relationship information used in each PUCCH repeat transmission; and
- transmit the PUCCH by using the determined spatial relationship information.

In some possible implementations of the embodiments of the present disclosure, any two PUCCH repeat transmissions use different pieces of spatial relationship information; or two PUCCH repeat transmissions in the multiple PUCCH repeat transmissions use different pieces of spatial relationship information.

Figure 13:
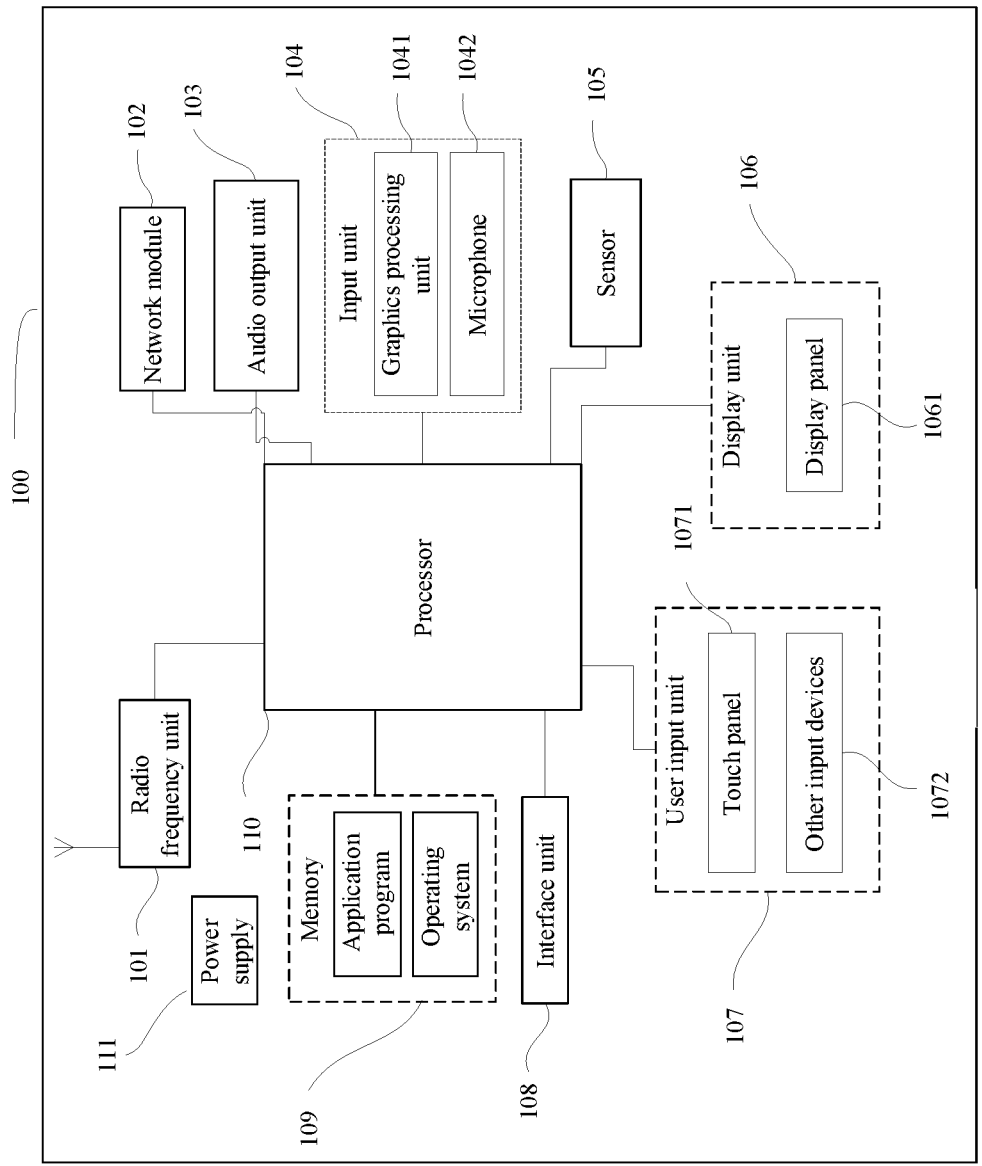
FIG. 13 is a schematic diagram of a hardware structure of a terminal device according to an embodiment of the present disclosure.

FIG. 13 is a schematic diagram of a hardware structure of a terminal device according to an embodiment of the present disclosure. The terminal device 100 includes, but is not limited to: a radio frequency unit 101, a network module 102, an audio output unit 103, an input unit 104, a sensor 105, a display unit 106, a user input unit 107, an interface unit 108, a memory 109, a processor 110, a power supply 111, and the like. It can be understood by a person skilled in the art that, the terminal device structure shown in FIG. 13 does not constitute any limitation on the terminal device, and the terminal device may include more or fewer components than those shown in the figure, or combine some components, or have different component arrangements. In this embodiment of the present disclosure, the terminal device includes but is not limited to a mobile phone, a tablet computer, a laptop computer, a palmtop computer, an in-vehicle terminal, a wearable device, a pedometer, and the like.

The processor 110 is configured to acquire the PUCCH repeat transmission information and determine the resource location of each PUCCH repeat transmission.

The radio frequency unit 101 is configured to transmit the PUCCH based on the repeat transmission information and the resource location.

By the embodiments of the present disclosure, the resource location of each PUCCH repeat transmission can be determined, and the PUCCH is transmitted based on the determined resource location, so that the flexibility of the PUCCH repeat transmission can be improved.

In some possible implementations of the embodiments of the present disclosure, the repeat transmission information may include the total number of repeat transmissions. The processor 110 may be configured to:
- determine the resource location of the first PUCCH transmission according to a start symbol of the PUCCH and the number of symbols; and
- determine the resource location of other times of PUCCH transmission according to a first preset resource location determining rule.

In some possible implementations of the embodiments of the present disclosure, the repeat transmission information may include the number of the time units of the PUCCH repeat transmissions and the number of the PUCCH repeat transmissions in each time unit. The processor 110 may be configured to:

determine the resource location of the first PUCCH transmission within any one of multiple time units according to a start symbol of the PUCCH and the number of symbols;

determine the resource location of other times of PUCCH transmission within the time unit according to a second preset resource location determining rule; and determine that the resource location of the PUCCH transmission within other time units is as same as the resource location of the PUCCH transmission within the time unit.

In some possible implementations of the embodiments of the present disclosure, the radio frequency unit 101 may be configured to:

transmit the PUCCH by using different pieces of spatial relationship information based on the repeat transmission information and the resource location.

In some possible implementations of the embodiments of the present disclosure, the processor 110 may be configured to:

for each PUCCH repeat transmission, determine spatial relationship information used in each PUCCH repeat transmission.

Correspondingly, the radio frequency unit 101 may be configured to:

transmit the PUCCH by using the determined spatial relationship information.

It should be understood that, in this embodiment of the present disclosure, the radio frequency unit 101 may be configured to receive and send information or receive and send a signal in a call process. For example, after downlink data from a base station is received, the processor 110 processes the downlink data. In addition, uplink data is sent to the base station. Usually, the radio frequency unit 101 includes but is not limited to an antenna, at least one amplifier, a transceiver, a coupler, a low noise amplifier, a duplexer, and the like. In addition, the radio frequency unit 101 may communicate with a network and another device through a wireless communication system.

The terminal device provides wireless broadband Internet access for the user by using the network module 102, for example, helping the user to send and receive an e-mail, brows a web page, and access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, call signal receiving sound or message receiving sound) related to a function performed by the terminal device 100. The audio output unit 103 includes a speaker, a buzzer, a telephone receiver, and the like.

The input unit 104 is configured to receive an audio signal or a video signal. The input unit 104 may include a Graphics Processing Unit (GPU) 1041 and a microphone 1042. The graphics processing unit 1041 processes image data of a static image or a video obtained by an image capturing apparatus (for example, a camera) in a video capturing mode or an image capturing mode. A processed image frame may be displayed on the display unit 106. The image frame processed by the graphics processing unit 1041 may be stored in the memory 109 (or other storage mediums) or transmitted via the radio frequency unit 101 or the network module 102. The microphone 1042 may receive a sound and can process such sound into audio data. Processed audio data may be converted, in a call mode, into a format that can be sent to a mobile communication base station by using the radio frequency unit 101 for output.

The terminal device 100 further includes at least one sensor 105, such as an optical sensor, a motion sensor, and other sensors. In some embodiments, the light sensor includes an ambient light sensor and a proximity sensor. The ambient light sensor may adjust luminance of the display panel 1061 based on brightness of ambient light. The proximity sensor may turn off the display panel 1061 and/or backlight when the terminal device 100 moves to an ear. As a type of the motion sensor, an accelerometer sensor may detect an acceleration value in each direction (generally, three axes), and detect a value and a direction of gravity when the accelerometer sensor is static, and may be used in an application for recognizing a posture of the terminal device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by a user or information provided for a user. The display unit 106 may include a display panel 1061, and the display panel 1061 may be configured in a form of a Liquid Crystal Display (LCD), an Organic Light-Emitting Diode (OLED), or the like.

The user input unit 107 may be configured to receive input digit or character information, and generate a key signal input related to a user setting and function control of the terminal device. In some embodiments, the user input unit 107 includes a touch panel 1071 and other input devices 1072. The touch panel 1071 is also referred to as a touchscreen, and may collect a touch operation performed by a user on or near the touch panel 1071 (such as an operation performed by a user on the touch panel 1071 or near the touch panel 1071 by using any proper object or accessory, such as a finger or a stylus). The touch panel 1071 may include two parts: a touch detection apparatus and a touch controller. The touch detection apparatus detects a touch orientation of the user, detects a signal brought by the touch operation, and sends the signal to the touch controller. The touch controller receives touch information from the touch detection apparatus, converts the touch information into touch point coordinates, sends the touch point coordinates to the processor 110, and receives and executes a command sent by the processor 110. In addition, the touch panel 1071 may be implemented by using multiple types such as a resistive type, a capacitive type, an infrared ray, and a surface acoustic wave. The user input unit 107 may include other input devices 1072 in addition to the touch panel 1071. In some embodiments, the other input devices 1072 may include but is not limited to: a physical keyboard, a function button (such as a volume control button, a switch button), a trackball, a mouse, and a joystick, which is not described herein.

Further, the touch panel 1071 may cover the display panel 1061. When detecting a touch operation on or near the touch panel 1071, the touch panel 1071 transmits the touch operation to the processor 110 to determine a type of a touch event. Then, the processor 110 provides corresponding visual output on the display panel 1061 based on the type of the touch event. In FIG. 13, although the touch panel 1071 and the display panel 1061 are used as two independent parts to implement input and output functions of the terminal device, in some embodiments, the touch panel 1071 and the display panel 1061 may be integrated to implement the input and output functions of the terminal device. This is not specifically limited herein.

The interface unit 108 is an interface for connecting an external apparatus with the terminal device 100. For example, the external apparatus may include a wired or wireless headset jack, an external power supply (or a battery charger) port, a wired or wireless data port, a storage card port, a port for connecting an apparatus having an identification module, an audio input/output (I/O) port, a video I/O port, a headset jack, or the like. The interface unit 108 may be configured to receive input (for example, data information and power) from an external apparatus and transmit the received input to one or more elements in the terminal device 100 or may be configured to transmit data between the terminal device 100 and the external apparatus.

The memory 109 may be configured to store a software program and various data. The memory 109 may mainly include a program storage area and a data storage area. The program storage area may store an operating system, an application required by at least one function (for example, a sound play function or an image display function), and the like. The data storage area may store data (for example, audio data or an address book) or the like created based on use of the mobile phone. In addition, the memory 109 may include a high-speed random access memory, and may further include a nonvolatile memory, for example, at least one magnetic disk storage device, a flash storage device, or another volatile solid-state storage device.

The processor 110 is a control center of the terminal device, is connected to each part of the entire terminal device by using various interfaces and lines, and performs various functions of the terminal device and data processing by running or executing the software program and/or the module that are/is stored in the memory 109 and invoking data stored in the memory 109, to perform overall monitoring on the terminal device. The processor 110 may include one or more processing units. For example, the processor 110 may be integrated with an application processor and a modem processor. The application processor mainly processes an operating system, a user interface, an application program, and the like, and the modem processor mainly processes wireless communication. It can be understood that, in some embodiments, the modem processor may not be integrated into the processor 110.

The terminal device 100 may further include the power supply 111 (for example, a battery) configured to supply power to various components. For example, the power supply 111 may be logically connected to the processor 110 through a power management system, so as to implement functions such as managing charging, discharging, and power consumption through the power management system.

In addition, the terminal device 100 includes some function modules not shown. Details are not described herein.

For example, the embodiments of the present disclosure further provide a terminal device, including a processor 110, a memory 109, and a computer program stored in the memory 109 and capable of running on the processor 110, wherein when the computer program is executed by the processor 110, the processes of the foregoing physical uplink control channel transmission method embodiments are implemented, and the same technical effects can be achieved. To avoid repetition, details are not described herein again.

The embodiments of the present disclosure further provide a computer readable storage medium; the computer readable storage medium stores a computer program instruction; and when the computer program instruction is executed by a processor, the processes of the foregoing physical uplink control channel transmission method embodiments provided by the embodiments of the present disclosure are implemented, and the same technical effects can be achieved. To avoid repetition, details are not described herein again. The example of the computer readable storage medium includes a non-transient computer readable storage medium, such as a Read-Only Memory (ROM), a Random Access Memory (RAM), a magnetic disk, or an optical disc.

The foregoing describes the aspects of the present disclosure with reference to flowcharts and/or block diagrams of the method, the apparatus (system), and the computer program product according to the embodiments of the present disclosure. It should be understood that each block in the flowchart and/or block diagram and a combination of blocks in the flowchart and/or block diagram may be implemented by a computer program instruction. These computer program instructions may be provided for a general-purpose computer, a dedicated computer, or a processor of another programmable data processing apparatus to generate a machine, so that when these instructions are executed by the computer or the processor of the another programmable data processing apparatus, specific functions/actions in one or more blocks in the flowcharts and/or in the block diagrams are implemented. The processor may be but is not limited to a general purpose processor, a dedicated processor, a special application processor, or a field programmable logic circuit. It should be further understood that each block in the block diagram or the flowchart and a combination of blocks in the block diagram or the flowchart may be implemented by using dedicated hardware that performs a specified function or operation, or may be implemented by using a combination of dedicated hardware and a computer instruction.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not exclude another same element in a process, method, article, or apparatus that includes the element.

Based on the descriptions of the foregoing implementations, a person skilled in the art may clearly understand that the method in the foregoing embodiment may be implemented by software in addition to a necessary universal hardware platform or by hardware only. In most circumstances, the former is an exemplary implementation. Based on such understanding, the technical solutions of the present disclosure essentially or the part contributing to existing technologies may be implemented in a form of a software product. The computer software product is stored in a storage medium (such as a ROM/RAM, a magnetic disk, or an optical disc) and includes several instructions for instructing a terminal (which may be a mobile phone, a computer, a server, an air conditioner, or a network device) to perform the methods described in the embodiments of the present disclosure.

The embodiments of the present disclosure are described with reference to the accompanying drawings. However, the present disclosure is not limited to the foregoing specific implementations. The foregoing specific implementations are merely examples, but are not limiting. A person of ordinary skill in the art may make many forms without departing from the objective and the scope of the claims of the present disclosure, and these forms all fall within the protection scope of the present disclosure.

The invention claimed is:

1. A Physical Uplink Control Channel (PUCCH) transmission method, comprising:
   acquiring PUCCH repeat transmission information, wherein the repeat transmission information comprises: the total number of the repeat transmissions;
   determining a resource location of each PUCCH repeat transmission, wherein determining the resource location of each PUCCH repeat transmission comprises: determining the resource location of the first PUCCH transmission according to a start symbol of the PUCCH and the number of symbols,
   wherein:
   the number of the PUCCH repeat transmissions within one sub-slot is one, and
   the resource location of other times of PUCCH transmission and the resource location of the first PUCCH transmission are the same in a sub-slot; and
   transmitting the PUCCH based on the repeat transmission information and the resource location, wherein the transmitting the PUCCH based on the repeat transmission information and the resource location comprises:
   transmitting the PUCCH by using different pieces of spatial relationship information based on the repeat transmission information and the resource location,
   wherein the spatial relationship information used in each PUCCH repeat transmission is determined according to a cyclic mode of a spatial relationship information.

2. The PUCCH transmission method according to claim 1, wherein multiple sub-slots for the PUCCH repeat transmission are consecutive or inconsecutive in time domain.

3. The PUCCH transmission method according to claim 1, wherein the repeat transmission information comprises: the number of time units of the PUCCH repeat transmissions and the number of the PUCCH repeat transmissions in each time unit; and
   the determining the resource location of each PUCCH repeat transmission comprises:
   determining the resource location of the first PUCCH transmission within any one of multiple time units according to a start symbol of the PUCCH and the number of symbols,
   determining the resource location of other times of PUCCH transmission within the time unit according to a second preset resource location determining rule, and
   determining that the resource location of the PUCCH transmission within other time units is as same as the resource location of the PUCCH transmission within the time unit.

4. The PUCCH transmission method according to claim 1, wherein the different pieces of spatial relationship information comprises:
   multiple pieces of spatial relationship information configured and activated for the PUCCH repeat transmission; and
   multiple pieces of spatial relationship information included in one of one or more spatial relationship information lists configured or activated for the PUCCH repeat transmission.

5. The PUCCH transmission method according to claim 1, wherein the transmitting the PUCCH by using different pieces of spatial relationship information comprises:
   for each PUCCH repeat transmission, determining spatial relationship information used in each PUCCH repeat transmission; and
   transmitting the PUCCH by using the determined spatial relationship information.

6. The PUCCH transmission method according to claim 1, wherein the spatial relationship information used in any two PUCCH repeat transmissions is different; or the spatial relationship information used in two PUCCH repeat transmissions in the multiple PUCCH repeat transmissions is different.

7. A terminal device, comprising: a memory, a processor, and a computer program stored in the memory and capable of running on the processor, wherein:
   when the processor executes the computer program, the processor performs a Physical Uplink Control Channel (PUCCH) transmission method, the method comprising:
   acquiring PUCCH repeat transmission information, wherein the repeat transmission information comprises: the total number of the repeat transmissions;
   determining a resource location of each PUCCH repeat transmission, wherein determining the resource location of each PUCCH repeat transmission comprises: determining the resource location of the first PUCCH transmission according to a start symbol of the PUCCH and the number of symbols,
   wherein:
   the number of the PUCCH repeat transmissions within one sub-slot is one, and
   the resource location of other times of PUCCH transmission and the resource location of the first PUCCH transmission are the same in a sub-slot; and
   transmitting the PUCCH based on the repeat transmission information and the resource location, wherein the transmitting the PUCCH based on the repeat transmission information and the resource location comprises:
   transmitting the PUCCH by using different pieces of spatial relationship information based on the repeat transmission information and the resource location,
   wherein the spatial relationship information used in each PUCCH repeat transmission is determined according to a cyclic mode of a spatial relationship information.

8. The terminal device according to claim 7, wherein multiple sub-slots for the PUCCH repeat transmission are consecutive or inconsecutive in time domain.

9. The terminal device according to claim 7, wherein the different pieces of spatial relationship information comprise:
   multiple pieces of spatial relationship information configured and activated for the PUCCH repeat transmission; and
   multiple pieces of spatial relationship information included in one of one or more spatial relationship information lists configured or activated for the PUCCH repeat transmission.

10. The terminal device according to claim 7, wherein the transmitting the PUCCH by using different pieces of spatial relationship information comprises:
    for each PUCCH repeat transmission, determining spatial relationship information used in each PUCCH repeat transmission; and
    transmitting the PUCCH by using the determined spatial relationship information.

11. The terminal device according to claim 7, wherein the spatial relationship information used in any two PUCCH repeat transmissions is different; or the spatial relationship information used in two PUCCH repeat transmissions in the multiple PUCCH repeat transmissions is different.

12. A non-transitory computer readable storage medium, wherein the non-transitory computer readable storage medium stores a computer program, and the computer program, when executed by a processor, causes the processor to perform a Physical Uplink Control Channel (PUCCH) transmission method, the method comprising:

acquiring PUCCH repeat transmission information, wherein the repeat transmission information comprises: the total number of the repeat transmissions;

determining a resource location of each PUCCH repeat transmission, wherein determining the resource location of each PUCCH repeat transmission comprises: determining the resource location of the first PUCCH transmission according to a start symbol of the PUCCH and the number of symbols, wherein:
the number of the PUCCH repeat transmissions within one sub-slot is one, and
the resource location of other times of PUCCH transmission and the resource location of the first PUCCH transmission are the same in a sub-slot; and transmitting the PUCCH based on the repeat transmission information and the resource location, wherein the transmitting the PUCCH based on the repeat transmission information and the resource location comprises:

transmitting the PUCCH by using different pieces of spatial relationship information based on the repeat transmission information and the resource location, wherein the spatial relationship information used in each PUCCH repeat transmission is determined according to a cyclic mode of a spatial relationship information.

\* \* \* \* \*